United States Patent [19]

Slocombe et al.

[11] 4,413,694
[45] Nov. 8, 1983

[54] LOCK ASSEMBLY FOR A TILTABLE TRUCK CAB

[75] Inventors: Joseph Slocombe, Chelmsford; Michael A. Parry, Billericay, both of England

[73] Assignee: Ford Motor Company, Dearborn, Mich.

[21] Appl. No.: 156,230

[22] Filed: Jun. 4, 1980

[30] Foreign Application Priority Data

Jun. 14, 1979 [GB] United Kingdom ............... 7920801

[51] Int. Cl.³ .................... B62D 27/06; B62D 33/06
[52] U.S. Cl. ............................ 180/89.14; 292/140
[58] Field of Search ............ 180/89.14, 89.13, 89.15; 292/144, 140, 302

[56] References Cited

U.S. PATENT DOCUMENTS

| | | | |
|---|---|---|---|
| 3,819,225 | 6/1974 | Carlisle et al. | 180/89.14 |
| 3,823,976 | 7/1974 | McMillen | 180/89.14 |
| 4,114,718 | 9/1978 | Lipshield | 180/89.14 |
| 4,225,004 | 9/1980 | Lipshield | 180/89.14 |
| 4,279,321 | 7/1981 | Stone | 180/89.14 |

Primary Examiner—Richard A. Bertsch
Attorney, Agent, or Firm—John J. Roethel; Daniel M. Stock; Clifford L. Sadler

[57] ABSTRACT

A lock assembly for retaining a tiltable cab structure in a normal operating position relative to the body structure of a truck. Each lock assembly comprises two transversely spaced latches, each including a keeper attached to one of the structure, a latch member attached to the other structure and mounted for movement into and out of a closed position to effect latching engagement with the keeper, and an operating lever movable between an unlocking position in which the latch member is disengageable with the keeper and a locking position in which the latch member is retained in engagement with the keeper. A releasing linkage interconnects the operating levers for simultaneously moving the operating levers between the locking and unlocking positions.

2 Claims, 8 Drawing Figures

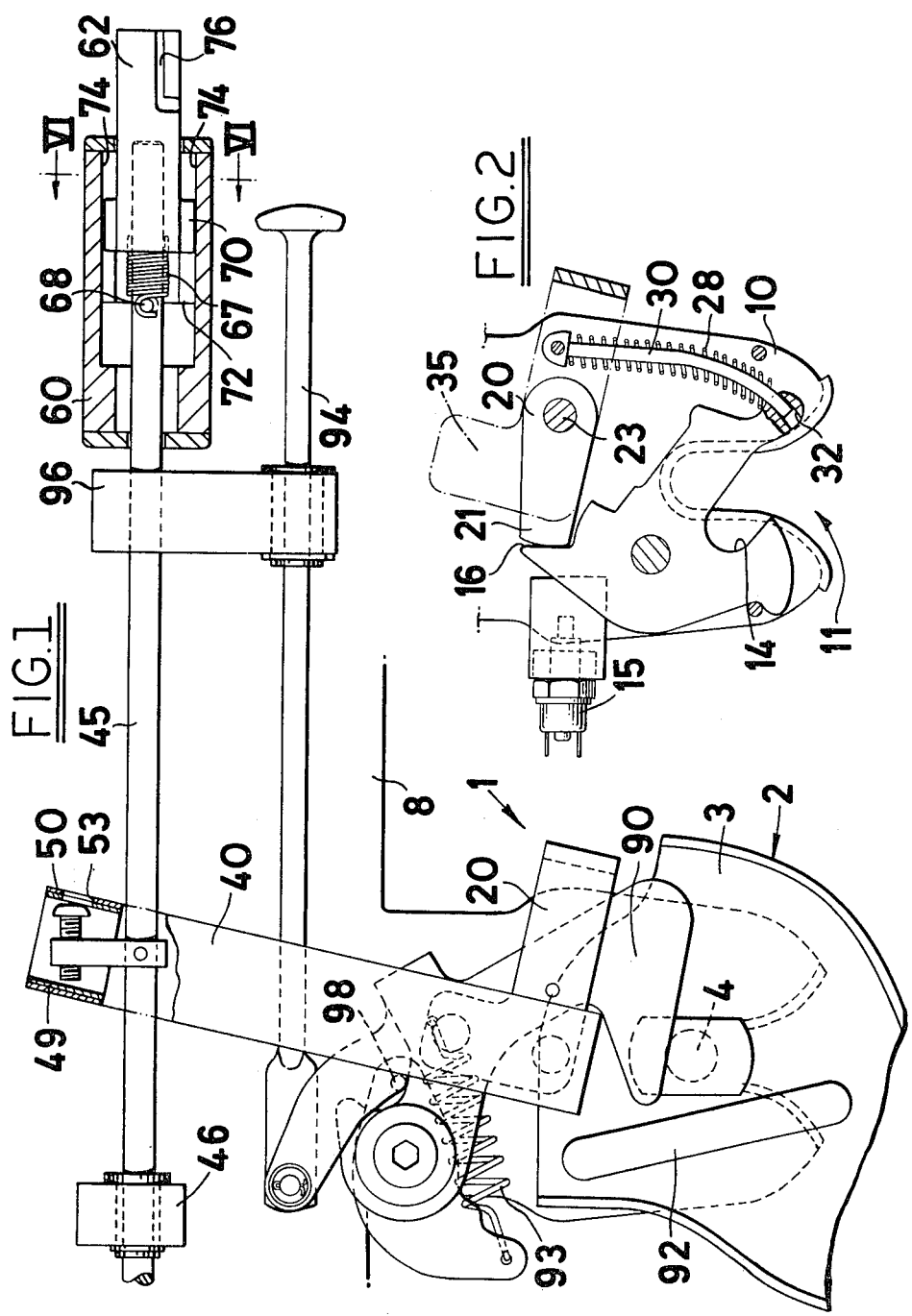

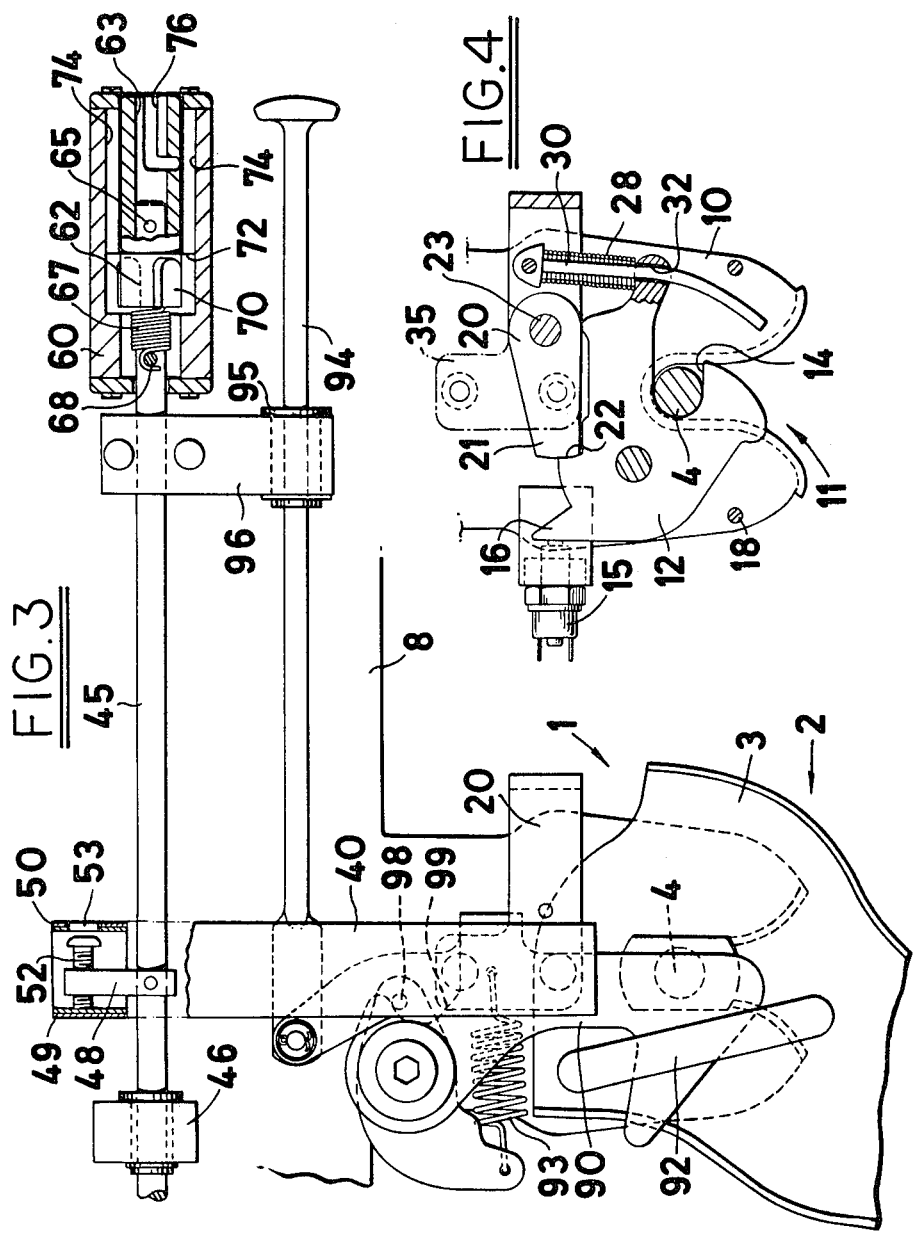

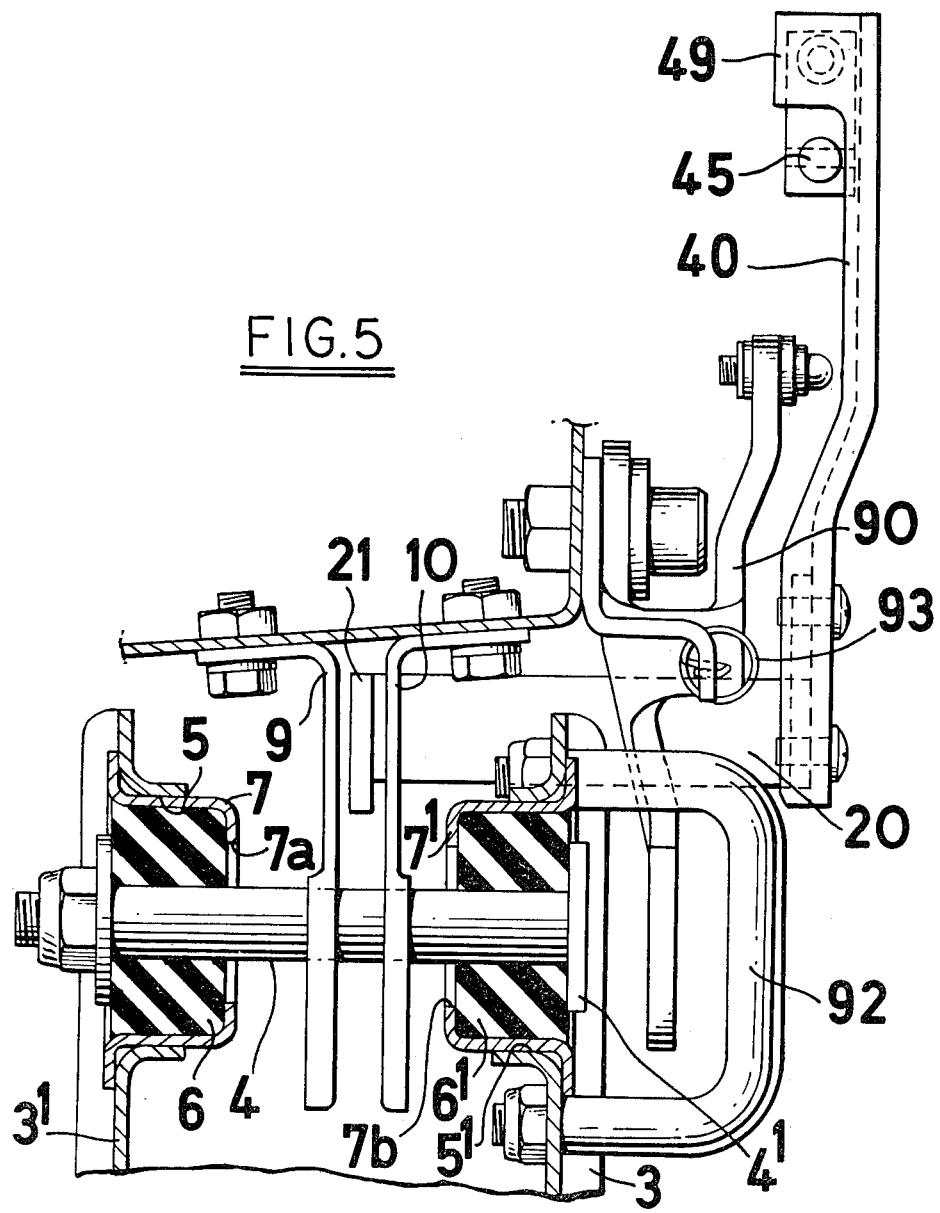

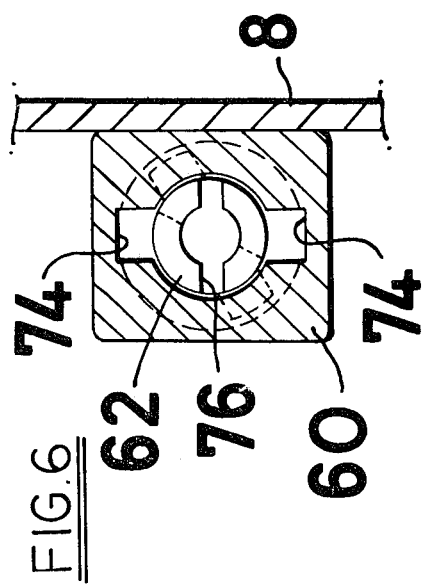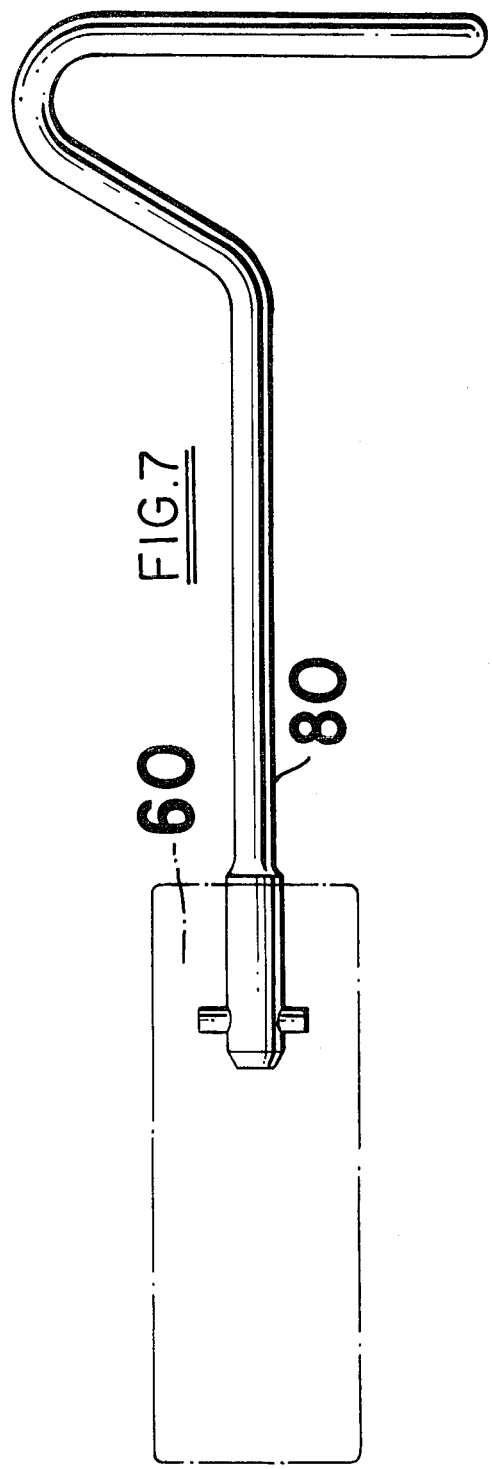

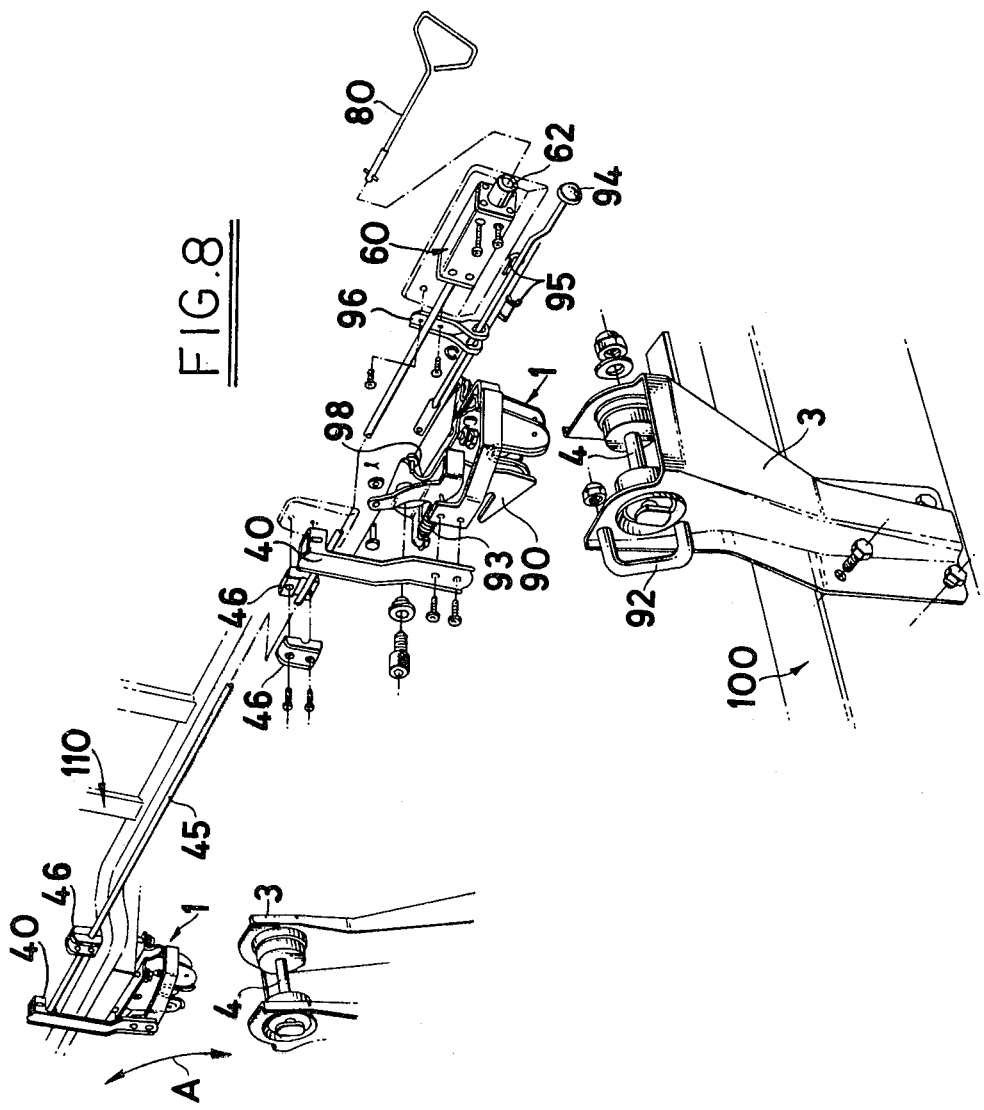

LOCK ASSEMBLY FOR A TILTABLE TRUCK CAB

BACKGROUND OF THE INVENTION

This invention relates to lock assemblies for tiltable truck cab structures.

In one known type of truck, a cab structure is mounted on the body structure of the truck for movement between a normal operating position and a tilted position in which access can be gained to the engine compartment of the truck. The tiltable cab structure is held in the normal operating position by a lock assembly which normally is operated by a handle located on the exterior of the cab.

Hitherto, a single lock assembly has been provided for the cab structure. Failure of this lock assembly as a result, for example, of an impact, could therefore result in the cab structure tilting whilst the vehicle is occupied.

SUMMARY OF THE INVENTION

According to the present invention there is provided a lock assembly for retaining a tiltable cab structure in a normal operating position relative to the body structure of a truck and comprising two transversely spaced latches, each including a keeper attached to one of the structures, a latch member attached to the other structure and mounted for movement into and out of a closed position in which it effects latching engagement with the keeper, and an operating lever movable between an unlocking position, in which the latch member is disengageable from the keeper, and a locked position, in which the latch member is retained in engagement with the keeper, and a releasing linkage interconnecting the operating levers of the latches for simultaneously moving the operating levers between their locking and unlocking positions.

By providing two latches for the cab structure, the cab structure will remain locked in its normal operating position even if one of the latches should fail. Nevertheless, since both latches are operated by a common releasing linkage, the cab structure can be released and moved into its tilted position from a single operating station on the truck. Conveniently, the two spaced latches will be located towards the rear of the cab structure and the releasing linkage will be operable from one side of the truck.

Preferably, each operating lever is movable into the locking position only when the latch member is in the closed position. Since the operating levers are linked for simultaneous movement, this arrangement ensures that the releasing linkage cannot be operated unless the latch members of both the latches are engaged with their respective keepers. In the preferred embodiment of the invention, this is achieved by providing the operating lever and the latch member of each latch with mutually engaging cam surfaces which allow movement of the operating lever into the locking position only when the latch member is in the closed position.

DESCRIPTION OF THE DRAWINGS

A preferred embodiment of the invention will now be described by way of example only with reference to the drawings in which:

FIG. 1 is a side view, partly in cross-section, of a lock for a tiltable cab structure of a truck in accordance with the invention, the lock being unlocked;

FIG. 2 is a side view of a latch assembly incorporated in the lock of FIG. 1;

FIG. 3 is a view similar to FIG. 1 showing the lock in a locked position;

FIG. 4 is a view similar to FIG. 2 showing the latch assembly in the locked position;

FIG. 5 is an end view of the lock of FIGS. 1 and 2, the latch assembly having been omitted for clarity.

FIG. 6 is a cross-section of the lock taken along lines VI—VI of FIG. 1;

FIG. 7 is a plan of an operating handle used in conjunction with the lock of FIGS. 1 to 6 and FIG. 8 is an "exploded" perspective view of the lock installed in a vehicle.

DETAILED DESCRIPTION OF THE INVENTION

Referring to the drawings, a truck body structure 100 (FIG. 8) carries a cab structure 110 for pivotable movement as indicated by the arrow A in FIG. 8 about a transverse axis adjacent the front of the truck so that the cab structure can be moved between normal position and a tilted position in which access can be gained to the engine compartment of the truck. The cab structure is retained in its normal operating position by means of a lock which comprises two similar latch mechanisms, indicated by the reference numerals 1, located on opposite sides of the vehicle radially spaced from the transverse axis and located adjacent the rear edges of the cab and body structures. The two latch mechanisms 1 are identical in construction and only one of the latch mechanisms will be described in detail.

Referring to FIGS. 1 and 5, each latch mechanism 1 comprises a keeper 2 positioned on the body structure of the truck inwardly of the front wheel arch of the body structure. The keeper 2 comprises an upstanding bracket 3 rigidly mounted on the body structure of the truck. The bracket 3 includes two side flanges 3'. A keeper pin 4 is mounted in two apertures 5,5' in the side flanges 3' by means of resilient rubber bushes 6,6'. Each bush 6,6' is supported in a metal sleeve 7,7' which defines an aperture 7a,b, through which the pin 4 extends. The aperture 7a is larger in diameter than the pin 4. The pin 4 is retained in the bracket 3 by a head 4' on one end of the pin, and a nut and washer on the other end of the pin, the head and washer being larger in diameter than the apertures 7a,b. If desired, the bushes 6,6' can be pre-stressed by tightening the nuts on the keeper 4.

The transverse frame member 8 of the cab structure carries two adjacent depending jaws 9, 10 which define a downwardly open recess 11 within which the pin 4 of the keeper is received when the cab structure is in its normal operating position (see FIG. 4). A latch member 12 is pivotally mounted between the jaws 9, 10. The member 12 also defines a recess 14 for receiving the pin 4 of the keeper 2. The member 12 is rotatable between an open position, illustrated in FIG. 2 and a closed position illustrated in FIG. 4. In the open position, the recess 14 in the member 12 allows the pin 4 of the keeper 2 to move into and out of the recess 11 in the jaws 9,10. In the closed position, the latch member 12 holds the pin 4 firmly in contact with the jaws 9, 10 and prevents it from disengaging therefrom. The latch mechanisms therefore act as supports for the cab structure when the cab structure is in its normal operating position.

The rubber bushes 6,6' permit limited relative movement between the keeper pin 4 and the bracket 3 so that vibrations between the body structure and the cab structure are damped thereby reducing the level of noise in the cab when the truck is in motion. Additionally, the bushes 6,6' reduce the noise created when the cab is lowered onto the pins 4 into its normal operating position.

The presence of the rubber bushes 6,6' also has the effect of reducing wear on the pin 4 caused by repeated impacts between the pin 4, the jaws 9, 10, and the latch member 12. Thus, since the pin 4 can yield relative to the bracket 3 the force of any impact applied to the pin by the cab is much smaller than the force which would be exerted if the pin were fixed.

The keeper pins 4 are both oriented at 90° to the transverse pivot axis of the cab structure. While the pivotal mountings of the cab structure serve to locate the cab structure relative to the body structure in the fore-and-aft direction, the keeper pins 4 locate the cab structure in the transverse direction. Since the jaws 9, 10 define a flared entrance, they guide the cab structure into position relative to the body structure as the cab structure is moved into its normal operating position. Any minor misalignment in the relative positions of the cab and body structures due to manufacturing tolerances is accommodated by the resilient bushes 6,6' which allow the keepers 4 to deflect relative to the brackets 3 upon closure of the cab structure. The resulting stress in the bushes 6,6' applies a reaction force to the pins 4 which ensures that the pins 4 are held firmly against the latch members 12.

A limit switch 15 is mounted on the jaws 9, 10 for engagement with an upstanding projection 16 on the latch member 12 when the latch member 12 is in its closed position. The movement of the latch member 12 into the open position is limited by a stop 18 mounted between the two jaws, 9, 10.

The latch member 12 is retained in the closed position by means of a pawl 20. The pawl 20 is generally U-shaped one limb 21 extending between the jaws 9, 10 into engagement with an abutment 22 on the latch member 12. The pawl 20 is pivotally connected to the jaws 9, 10 so that rotation of the pawl about its pivotal axis 23 disengages the limb 21 from the abutment 22, as illustrated in FIG. 2, thus permitting the latch member 12 to rotate into the open position. The latch member 12 is biased into the open position by means of a compression spring 28 which acts between the pawl 20 and the latch member 12. The compression spring 28 is located between the pawl 20 and the latch member 12 by means of a guide rail 30 around which the compression spring 28 is coiled. The guide rail 30 is pivotally connected at one end to the pawl 20 and passes through an aperture 32 in the latch member 12. The guide rail 30 is a sliding fit in the aperture 32 and is curved to permit free movement of the latch member 12 into the open position.

The other limb 35 of the U-shaped pawl 20 is bolted to an operating lever 40. A transverse operating rod 45 is mounted on the frame structure 8 of the cab by means of two spaced brackets, one of which is illustrated at 46. The operating rod 45 is connected to each of the operating levers 40 of the lock assemblies on opposite sides of the truck. The connection between the operating rod 45 and each operating lever 40 is effected by means of a block 48 which is rigidly secured to the operating rod 45 and which projects upwardly from the operating rod 45 between two flanges 49, 50 formed on the upper end of the operating lever 40. A locking bolt 52 is threadedly mounted in the block 48 and can be adjusted by passing a screw-driver through an aperture 53 in one of the flanges 50. In use, the locking bolt 52 is threaded into the block 48 so that the end of the bolt 52 engages firmly against the flange 49 of the operating lever when the lock assemblies are both locked. Tightening of the bolt 52 against the flange 49 eliminates free movement between the operating lever 40 and the pawl 20, and takes up slackness in the system due to manufacturing tolerances thus reducing rattling when the truck is in motion and preventing accidental release of the lock as a result of movement of the lever 40.

The end of the operating rod 45 is slidingly received in one end of a housing 60 mounted on the cab structure. An actuating member 62 is also mounted for sliding movement within the housing 60 between a withdrawn position (illustrated in FIG. 3) and an extended position (illustrated in FIG. 1). The actuating member 62 defines a central axial bore 63 within which the end of the operating rod 45 is received. The operating rod 45 is fixed within the bore 63 by means of a transverse pin 65. The pin 65 is received in a circumferential groove in the wall of the bore 63 so that the actuating member 62 can rotate relative to the operating rod 45 but is fixed for axial sliding movement therewith. The operating rod 45 and the actuating member 62 are connected together by a coil spring 67. This spring 67 is in the form of a double helix. One end of each helix is connected to a transverse pin 68 mounted in the operating rod 45 and the other end of each helix is received in an axial bore in the end of the actuating member 62. The ends of each helix are located on diametrically opposite sides of the actuating member 62 and the operating rod 45 respectively so that when the actuating member 62 is rotated relative to the operating rod 45 an even bias is applied to the opposite sides of the operating rod 45 and the actuating member 62.

The end of the actuating member 62 adjacent the coil spring 67 includes two diametrically opposed radially extending projections 70 which, in the withdrawn position of the actuating member 62, as illustrated in FIG. 3, engage with an internal wall 72 in the housing which prevents axial movement of the actuating member 62 into the extended position illustrated in FIG. 1. The housing 60 defines two diametrically opposed axially extending internal grooves 74 which register with the projections 70 when the actuating member 62 is rotated through 60° from the position illustrated in FIG. 3. In the position illustrated in FIG. 3 therefore, the actuating member 62 is locked and cannot slide relative to the housing 60. Rotation of the actuating member 62 relative to the operating rod 45 causes the coil spring 67 to be stressed. The actuating member 62 is therefore biased into the locking position by the spring 67. At the end of the actuating member 62, remote from the coil spring 67, the central bore 63 is provided two L-shaped slots 76 which provide a bayonet connection with an operating handle 80, illustrated in FIG. 7. The operating handle 80 is detachable from the actuating member 62 and therefore may be stored in a position remote from the lock, for example in the interior of the cab. This prevents the lock from being released accidentally.

The lock also incorporates a safety catch to safeguard further against accidental release of the lock. To facilitate assembly, the safety catch is constructed as a separate subassembly from the latches and the latch operating mechanism and is operable independently thereof. The assembly comprises a safety latch member 90 which is pivotally mounted on the frame structure 8 for movement between a latched position, illustrated in FIG. 3, and an unlatched position, illustrated in FIG. 1. In the latched position, the safety latch 90 projects into a closed aperture defined by a U-shaped catch 92 mounted on the bracket 3 of the keeper 2. The provision of a closed aperture for engagement by the latch 90 is preferred to a simple keeper pin because the risk of disengagement of the safety catch in the event of an impact on the truck is reduced. The catch 92 is positioned relative to the safety latch member 90 so that there is no contact between the catch and the safety latch member, thereby preventing the latch member 90 from rattling against the catch 92 when the truck is in motion. The safety latch member 90 is movable against the bias of a tension spring 93 between the latched and unlatched positions by means of a releasing handle 94 mounted in a split bush 95, a bracket 96 secured by the frame member 8 adjacent the housing 60 for the actuating member 62.

When the safety catch is engaged, the end of the handle 94 lies in the same vertical plane as the end of the housing 60 so that the operator can quickly observe the condition of the safety catch.

The safety latch mechanism is provided on only one of the lock assemblies 1 so that the complete lock is operable from one side of the vehicle. The movement of the safety latch 90 between the latched and unlatched positions is limited by a single stop pin 98 which is received within a recess 99 in the safety latch member and engages opposite walls thereof in the latching and unlatching positions respectively. The stop pin 98 serves the additional function of resisting the torque which is applied to the safety latch member 90 during assembly as the pivotal mounting for the safety latch member 90 is tightened.

The operation of the lock is as follows. With the cab in its normal operating position the lock will be in the closed position illustrated in FIG. 3. In this position the projections 70 engage with the internal wall 72 in the housing 60 and prevent movement of the actuating member 62, and therefore the operating rod 45 and levers 40, to the right as seen in FIG. 3. Accidental blows to the levers 40 or operating rod 45 cannot therefore release the latches.

If it is desired to release the lock, the handle 80 is inserted into the slots 76 in the end of the actuating member 62 and rotated through 60° to effect a driving engagement in the inner ends of the L-shaped slots 76. The handle 80 is then rotated through a further 60° in order to bring the projections 70 on the inner end of the actuating member 62 into registry with internal grooves 74 in the housing 60. The handle 80 is then pulled so that the actuating member 62 slides in the housing 60 into the withdrawn position illustrated in FIG. 1. The operating rod 45 moves with the actuating member 62, causing the locking bolt 52 to engage with the flange 50 of the operating lever 40. Movement of the operating lever 40 allows the pawl 20 to pivot about the pivot axis 23 under the influence of the compression spring 28, thereby disengaging the limb 21 of the pawl 20 from the abutment 22 on the latch member 12. The latch member 12 then rotates into its open position under the influence of the compression spring 28. The safety latch is then released by depressing the releasing handle 94 to disengage the safety latch member 90 from the catch 92, thus allowing the cab to be tilted relative to the body structure. Movement of the latch member 12 into the open position disengages the projection 16 from the switch which in turn actuates a warning light in the truck cab.

When the cab is returned to its normal operating position, the lock will initially occupy the configuration indicated in FIG. 1. As the cab structure moves toward the body structure, the pin 4 of the keeper 2 enters a recess 11 in the jaws 9 and 10 and engages in the recess 14 in the latch member 12. Continued downward movement of the cab structure causes the pin 4 to rotate the latch member 12, thereby compressing the spring 28. As the cab structure approaches the end of its movement, the projection 16 engages with the limit switch and the pawl 20 rotates anticlockwise as illustrated in FIG. 1 under the influence of the compression spring 28 to engage with the abutment 22 on the latch member 12, thus locking the latch member 12 in the closed position. As the pawl 20 moves into the locked position, the operating lever 40 is also moved anticlockwise as seen in the drawings so that the flange 50 engages the locking bolt 52. The continued movement of the operating lever 40 causes the operating rod 45 to slide to the left as shown in the drawings thus moving the actuating member 62 from the extended position shown in FIG. 1 into the withdrawn position indicated in FIG. 3. When the actuating member is fully withdrawn into the housing 60, it is rotated by the coil spring 67 so that the projections 70 are moved out of registry with the internal grooves 74. Lowering the cab into its normal operating position therefore automatically closes the latches and causes the lock to move into its locking position. No further manipulation of the lock by the operator is required. During the closing movement, of the lock assembly, the safety latch member 90 initially engages the upper limb of the catch 92 and is displaced in an anticlockwise direction as seen in the drawings against the bias of the tension spring 93. As the latch member 12 engages the pin the latch member 90 automatically engages the underside of the upper limb of the catch 92. When the lock is fully closed, the safety latch member 90 moves into the locking position illustrated in FIG. 3 between the two limbs of the catch 92.

Since the movement of the pawl 20 into engagement with the abutment 22 on the latch member 12 is fully engaged in its closed position, the actuating member 62 is only moved from the extended position into the withdrawn position when the lock assembly is fully closed. In this position the end face of the actuating member lies flush with the end face of the housing 60. The projection of the actuating member 62 from the end face of the housing 60 therefore gives a visible indication of the condition of the cab lock. The condition of the lock may be indicated more clearly by forming the actuating member from a plastic material such as nylon having a different colour from the material from which the end face of the housing 60 is composed.

We claim:

1. A lock assembly for retaining a tiltable cab structure in a normal operating position relative to the body structure of a truck and comprising two transversely spaced latches, each including a keeper attached to one of the structures, a latch member attached to the other structure and mounted for movement into and out of a closed position to effect latching engagement with the keeper, and an operating lever movable between an unlocking position in which the latch member is disengageable with the keeper and a locking position in which the latch member is retained in engagement with the keeper, and a releasing linkage interconnecting the operating levers for simultaneously moving the operating levers between the locking and unlocking positions, the operating lever and the latch member of each latch including mutually engaging cam surfaces which allow movement of the operating lever into the locking position only when the latch member is in the closed position.

2. A lock assembly for retaining a tiltable cab structure in a normal operating position relative to the body structure of a truck and comprising two transversely spaced latches, each including a keeper attached to one of the structures, a latch member attached to the other structure and mounted for movement into and out of a closed position to effect latching engagement with the keeper, and an operating lever movable between an unlocking position in which the latch member is disengageable with the keeper and a locking position in which the latch member is retained in engagement with the keeper, the operating lever is movable into the locking position only when the latch member is in the closed position, a releasing linkage interconnecting the operating levers for simultaneously moving the operating levers between the lock and unlocking positions, and wherein the latch member is moved into the closed position by engagement with the keeper when the cab structure is moved from the tilted position into the normal operating position.

* * * * *